United States Patent [19]
Jahn

[11] 3,988,500
[45] Oct. 26, 1976

[54] NON-BLOCKING, OXYGEN-RESISTANT VINYLIDENE CHLORIDE POLYMER COATINGS AND COMPOSITE ARTICLES PREPARED THEREFROM

[75] Inventor: Robert G. Jahn, Saginaw, Mich.

[73] Assignee: The Dow Chemical Company, Midland, Mich.

[22] Filed: Nov. 22, 1974

[21] Appl. No.: 526,437

[52] U.S. Cl. .............................. 428/518; 427/407 E; 427/419 R; 428/500; 428/515
[51] Int. Cl.$^2$ ...................... B32B 27/00; B05D 7/00
[58] Field of Search ................. 428/500, 515, 518; 427/407, 419; 260/876, 881, 884

[56] References Cited
UNITED STATES PATENTS

| | | | |
|---|---|---|---|
| 2,829,068 | 4/1958 | Stewart | 428/483 |
| 3,309,330 | 3/1967 | Settlage | 428/518 |
| 3,380,844 | 4/1968 | Menikheim et al. | 428/518 |
| 3,387,997 | 6/1968 | Sculley | 428/522 |
| 3,617,368 | 11/1971 | Gibbs et al. | 428/515 |
| 3,676,185 | 7/1972 | Phillips et al. | 428/518 |

*Primary Examiner*—Lorraine T. Kendell
*Attorney, Agent, or Firm*—Ronald G. Brookens

[57] ABSTRACT

Heat-sealable vinylidene chloride polymer coatings having improved anti-blocking tendencies while unexpectedly retaining resistance to oxygen transmission are obtainable by overcoating a preformed normally crystalline vinylidene chloride polymer coating with an aqueous dispersion of the sodium salt of lauryl alcohol sulfate.

3 Claims, No Drawings

NON-BLOCKING, OXYGEN-RESISTANT VINYLIDENE CHLORIDE POLYMER COATINGS AND COMPOSITE ARTICLES PREPARED THEREFROM

BACKGROUND OF THE INVENTION

The normally crystalline vinylidene chloride polymers are widely used as barrier and heat seal coatings for paper, films and sheets. For optimum properties, such coatings are generally deposited as a film forming aqueous dispersion of latex. Heretofore, such coatings have been formulated with significant amounts of natural or synthetic materials such as the ester waxes, talc, clay or calcium carbonate to prevent undesirable agglutination, i.e., blocking or sticking of wound-up films and the like coated articles, particularly when such latexes are used to coat polyolefin film and especially corona or flame treated polypropylene film (as discussed in U.S. Pat. No. 3,387,997).

The prior-used formulation additives have generally been found to be effective for minimizing blocking of coated film structures, however, their presence in the coating material results in an undesirable reduction in the oxygen barrier properties of such coatings.

It is the primary object of the present invention to provide a means for obtaining heat-sealable coatings based on the normally crystalline vinylidene chloride polymers which coatings have enhanced resistance to blocking without significant detriment to oxygen barrier properties. It is a further object of the invention to provide highly useful composite articles utilizing such coatings.

SUMMARY OF THE INVENTION

Heat-sealable coatings having the above combination of desirable properties are attained by utilization of a process comprising overcoating a preformed coating prepared from a normally crystalline vinylidene chloride polymer with an aqueous dispersion consisting essentially of water and the sodium salt of lauryl alcohol sulfate then drying said overcoating. Composite articles contemplated specifically by the present invention comprise 1. a polymer film substrate having at least one surface wherein the contact angle of water to said surface is less than about 80°,
2. a coating for said surface consisting essentially of the dried residue of a substantially non-formulated normally crystalline vinylidene chloride polymer containing in chemically combined form from about 70 to about 95 percent by weight of vinylidene chloride and about 5 to about 30 percent by weight of one or more monoethylenically unsaturated comonomer, and
3. a surfactant anti-block overcoating comprising the dried residue of an aqueous dispersion consisting essentially of water and from about 0.25 to about 1.0 percent based on dispersion weight of the sodium salt of lauryl alcohol sulfate.

As used in this invention, the terms "consisting essentially" or "consists essentially" mean that the named materials are essential but that other compounds which do not substantially detract from the basic properties of the composition can also be present.

DESCRIPTION OF THE PREFERRED EMBODIMENTS

The expression "normally crystalline vinylidene chloride polymers" as used herein means polymers containing from about 70 to about 95 percent by weight vinylidene chloride and about 30 to about 5 percent by weight of at least one monomer copolymerizable with vinylidene chloride. Exemplary of such comonomers are vinyl chloride, vinyl acetate, vinyl propionate, acrylonitrile, alkyl and aralkyl acrylates and alkacrylates having alkyl and aralkyl groups of up to about eight carbon atoms, acrylic acid, acrylamide, vinyl alkyl ethers, vinyl alkyl ketones, acrolein, allyl esters and ethers and butadiene, among others.

The vinylidene chloride polymer coating compositions contemplated for use by the present invention include any aqueous dispersions or latex of a normally crystalline vinylidene chloride polymer.

Preferred latex coating compositions contemplated herein are generally free from conventionally used antiblocking and slip agents, although small amounts of such materials may be contained therein if desired. Such coating compositions may additionally contain small amounts, e.g., from about 0.5 to about 2.5 parts of polymer solids, of nonionic surface active agents such as nonyl phenyl polyethoxyethanol, octyl phenyl polyethoxyethanol and the like; anionic materials such as the sodium and ammonium oleates, or salts of fatty acids as well as salts of resin acids, without detriment to adhesion, barrier or heat-sealability properties of the coating. Further, the vinylidene chloride polymer constituent of such latex may be interpolymerized with comonomeric materials having surface active characteristics, without adverse affect upon coating adhesion, barrier or heat-sealability. The amount of surfactant used is preferably less than that required for complete surface coverage of the latex particles, with a latex surface tension of from about 40–55 dynes/cm being permissible. Typically, the latexes contemplated for use have particle sizes ranging from about 300 angstroms to about 3000 angstroms, with particle sizes of angstroms about 1,500 to about 2,000 anstroms being preferred. The latex materials generally contain solid material in amounts of from about 10 to about 50 percent based on the weight of the latex. Exemplary of particularly useful latex materials are those described by U.S. Pat. No. 3,617,368.

The aqueous dispersions used to overcoat preformed coatings formed from such normally crystalline vinylidene chloride polymers consist essentially of water and from about 0.25 to about 1 percent based on dispersion weight of the sodium salt of lauryl alcohol sulfate.

Exemplary of the substrates which may be effectively coated to provide such composite articles include synthetic resinous film and foils such as those prepared from the polyolefins such as polyethylene, polypropylene, and copolymers thereof, thermoplastic polymers and copolymers of methylmethacrylate, such as its homopolymer and copolymers thereof with vinylidene chloride, thermoplastic polymers and copolymers of vinyl chloride including homopolymeric vinyl chloride; and thermoplastic ester and ether derivatives of cellulose including cellulose acetate, cellulose propionate, cellulose acetate butyrate, ethyl cellulose, and the like. Other thermoplastic resinous substrates which may be used include chlorinated polyolefins such as chlorinated polyethylene, chlorinated polypropylene and the like, as well as copolymers of vinylidene chloride with one or more monomers such as vinyl chloride, acrylates, and esters such as ethyl acrylate and the like. Other substrates include the synthetic linear polyesters, as for example those materials prepared by reacting terephthalic acid, dialkyl terephthalates, or ester-forming derivates thereof with a glycol of the series

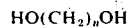

where $n$ is a whole number within the range of 2–10.

It is preferred that the substrate surface(s) to be coated provides a contact angle of water to such surface of less than about 80°, whereby required adhesion between the substrate and a subsequently applied base coat, in the absence of intermediate layers of fasteners, is achieved. Such characteristic may be inherent in the substrate surface or may be imparted thereto as, for example, by subjecting such surface, prior to coating thereof, to oxidative influences of the oxygen type, e.g., by the utilization of corona discharge or by flame treatment, or by chemical oxidative treatment such as by the application of dichromic acid, $NO_2$, and the like.

For optimum adhesion wetability, and other properties it is desirable to utilize macromolecular organic substrate surfaces wherein the contact angle of water to such surface is at least about 40° but less than about 80°, and preferably between about 45° and 70°.

The present invention contemplates the utilization as a base coat of an aqueous dispersion or latex of a normally crystalline vinylidene chloride polymer and particularly those polymers of from about 70 to 95 percent by weight of vinylidene chloride and from about 5 to about 30 percent by weight of one or more monoethylenically unsaturated comonomers. Such latexes are preferably substantially nonformulated. Such base coats may vary in thickness with coating thicknesses of from about 0.05 to 0.1 mil generally being preferred.

To the base coat is then applied a top coat of a normally crystalline vinylidene chloride polymer as described herein, preferably having a thickness of from about 0.1 to 0.2 mil. To such top coat is then applied the aqueous dispersion of the sodium salt of lauryl alcohol sulfate as described supra.

The following example illustrates the coating process of the present invention and preparation of highly useful composite articles according to the invention, but is not to be construed as limiting its scope. In the example, parts and percentages are by weight unless otherwise indicated. Where percentages are used, such percentage is measured as the percent of total monomer used.

EXAMPLE

In each of a series of experiments, a major surface of 85 gauge oriented polypropylene film was subjected to corona discharge to provide a contact angle of water on such surface in the 56°–60° range.

The treated surface of each of these substrate materials was then individually coated with a latex base coating consisting essentially of a blend of (A) about 60 parts by weight of an interpolymer of about 80 percent by weight vinylidene chloride, about 20 percent by weight methacrylonitrile and about 4 percent by weight acrylic acid, and which was polymerized in the presence of about 1.2 percent by weight sodium sulfoethyl methacrylate while utilizing a continuous monomer addition technique as essentially set forth in U.S. Pat. No. 3,617,368; and (B) about 40 parts by weight of an interpolymer of about 90 percent by weight vinylidene chloride, about 10 percent by weight butyl acrylate and about 5 percent by weight acrylic acid, which was polymerized in the presence of about 0.5 percent by weight sodium sulfoethyl methacrylate also utilizing the referred to continuous monomer addition process. The latex base coating contained about 43.8 percent of polymer solids and was applied to the treated surface of the substrate using a No. 5 coating rod. The resulting coating was then dried for a period of about 10 seconds at 250° F. in a convection air oven. Thereafter, the latex top coat was applied using a No. 5 coating rod to provide a total coating weight of about 4 to 5 pounds per 3,000 square feet of substrate surface. Then the anti-block coat was applied. The latex top coat and the surfactant anti-block coat compositions were as follows.

Top Coat

A polymer latex comprising an interpolymer of about 92 percent by weight vinylidene chloride, about 5.5 percent by weight acrylonitrile and about 2.5 percent by weight methylmethacrylate, and which was polymerized in the presence of from about 1.4 percent by weight of sodium sulfoethyl methacrylate by the continuous monomer addition process referred to supra.

Surfactant Anti-Block Coat

The dried residue of an aqueous dispersion consisting essentially of about 0.25 to about 1.0 percent based on dispersion weight of the sodium salt of lauryl alcohol sulfate.

The blocking (in grams) for each coated substrate was determined using a procedure as set forth by ASTM Test No. D-1893-67. In such test, 3½ inches wide by 6¾ inches long coated samples were placed with the anti-block coated surface of the coated film against a corona treated surface of polypropylene film, with a sheet of thin paper between each composite structure to form a stack of test specimens. The stack of test specimens was placed on a ¼ inch glass plate covered with 30 mil paperboard. A 3 × 3 × 1 inch piece of smoothly polished hard wood was placed in the test specimens, followed by a weighted container. The total weight applied was 9 pounds, representing 1 psi. The entire assembly was placed in a steam heated oven maintained at a temperature of about 52° C. over a 3 hour period, after which the weights were lifted and the test samples removed from the oven.

Testing was completed within 10 minutes after removing the samples from the oven, by pulling a 11/32 inch (N 9mm) smooth glass rod through the blocked interface at a rate of 10 inches/minute on a Scott X5 Tensile Tester.

Oxygen permeability in cc/100 in/²/24 hours was obtained for each coated substrate using a Modern Controls Octran 100 Tester, coated surface down in contact with $O_2$, at room temperature.

Results of such testing and identification of the surfactant anti-block coatings used are set forth in the following Table I.

TABLE I

| Anti-Block Surfactant | Concentration in H₂O | Blocking in grams | O₂ Permeability cc/100 in²/24 Hr. |
|---|---|---|---|
| None | | >1000 | 2.00 |
| Sodium Lauryl Sulfate | 0.25% | zero | 1.42 |
| | 0.50% | zero | 1.55 |
| | 1.00% | zero | 1.67 |
| Dihexyl Ester of Sodium Sulfosuccinic Acid | 1.00% | >5100, >6200 | 5.40 |
| Nonylphenoxypoly Ethanol | 1.00% | >3800, >2100 | 3.85 |

The above data illustrate the improved blocking resistance, without significant reduction in oxygen barrier, obtained by use of the prescribed overcoating materials, as compared to overcoatings based on other commonly used surfactant-type materials.

By way of further comparison sodium lauryl sulfate was formulated into the top coating at a concentration of 1.0 percent rather than applied as an overcoating from an aqueous dispersion. This experiment was undertaken to show the difference in the use of sodium lauryl sulfate as an overcoating as opposed to its conventional use as a formulation additive. The experimental data, as cited in the table below, is clearly illustrative of the overall improvement in blocking and in oxygen transmission attained by applying sodium lauryl sulfate as an overcoating rather than as a formulation additive.

TABLE II

| Top Coat | Surfactant Top Coat | Blocking in grams | O² Transmission CC/100 in.²/24 hr. |
|---|---|---|---|
| Contains no Sodium lauryl sulfate | 1.0% Solution of Sodium lauryl sulfate | zero | 1.67 |
| Contains 1.0% by weight Sodium lauryl sulfate | None | >1000 | 2.00 |

Accordingly, what is claimed is:
1. A composite article comprising
   1. a thermoplastic polymer film substrate having at least one surface wherein the contact angle of water to said surface is less than about 80°,
   2. a base coating adhered to said surface comprising essentially a blend of about 60 parts by weight of an interpolymer of about 80 percent by weight vinylidene chloride, about 20 percent by weight methacrylonitrile and about 4 percent by weight acrylic acid; and about 40 parts by weight of an interpolymer of about 90 percent by weight vinylidene chloride, about 10 percent by weight butyl acrylate and about 5 percent by weight acrylic acid,
   3. a top coating adhered to said base coating comprising essentially an interpolymer of about 92 percent by weight vinylidene chloride, abount 5.5 percent by weight acrylonitrile and about 2.5 percent by weight methylmethacrylate, and
   4. a surfactant anti-block overcoating adhered to said top coating consisting essentially of the dried residue of an aqueous dispersion of water and from about 0.25 to about 1.0 percent based on dispersion weight of the sodium salt of lauryl alcohol sulfate.

2. The article of claim 1 wherein said thermoplastic polymer film is a polyolefin film.

3. The article of claim 2 wherein said polyolefin film is an oriented polypropylene film.

* * * * *